(12) United States Patent
Choi et al.

(10) Patent No.: US 11,989,356 B2
(45) Date of Patent: May 21, 2024

(54) METHOD AND DEVICE FOR TRANSFORMING DEGREE OF FREEDOM IN MULSEMEDIA SYSTEM

(71) Applicant: POSTECH RESEARCH AND BUSINESS DEVELOPMENT FOUNDATION, Pohang-si (KR)

(72) Inventors: Seung Moon Choi, Pohang-si (KR); Gyeo Re Yun, Daegu (KR); Sang Yoon Han, Seoul (KR)

(73) Assignee: POSTECH Research and Business Development Foundation, Pohang-si (KR)

( * ) Notice: Subject to any disclaimer, the term of this patent is extended or adjusted under 35 U.S.C. 154(b) by 113 days.

(21) Appl. No.: 17/704,790

(22) Filed: Mar. 25, 2022

(65) Prior Publication Data
US 2022/0357804 A1    Nov. 10, 2022

(30) Foreign Application Priority Data

Apr. 28, 2021   (KR) .................. 10-2021-0055061
Mar. 25, 2022   (KR) .................. 10-2022-0037252

(51) Int. Cl.
*A63F 13/211*    (2014.01)
*A63F 13/25*     (2014.01)
(Continued)

(52) U.S. Cl.
CPC .......... *G06F 3/0346* (2013.01); *A63F 13/211* (2014.09); *A63F 13/25* (2014.09);
(Continued)

(58) Field of Classification Search
CPC ...... G06F 3/0346; G06F 3/011; A63F 13/211; A63F 13/25; A63F 13/428; A63F 13/5255; G06T 7/20; G06T 7/70; G06T 11/00

See application file for complete search history.

(56) References Cited

U.S. PATENT DOCUMENTS 5,623,878 A * 4/1997 Baxter .................. A63G 21/08
                                                       104/53
8,730,322 B2    5/2014 Rondinelli et al.
(Continued)

FOREIGN PATENT DOCUMENTS

KR    10-2014-0136328 A    11/2014
KR       20140136328 A *   11/2014
(Continued)

OTHER PUBLICATIONS

Sangyoon Han et al., "Camera Space Synthesis of Motion Effects Emphasizing a Moving Object in 4D films", 2021 IEEE Virtual Reality and 3D User Interfaces (VR), 2021, 47 total pages.

*Primary Examiner* — Temesghen Ghebretinsae
*Assistant Examiner* — Karin Kiyabu
(74) *Attorney, Agent, or Firm* — Sughrue Mion, PLLC

(57) ABSTRACT

A method of transforming a degree of freedom (DoF) in a multiple sensorial media (mulsemedia) system includes detecting, by a motion detector, a motion of an object to which motion effects are to be provided; calculating, by a motion proxy calculator, a motion proxy corresponding to the motion of the object; and transforming, by a transformer, the motion proxy into a motion command implementable within a motion range of a motion platform.

14 Claims, 9 Drawing Sheets

(51) Int. Cl.
*G06F 3/01* (2006.01)
*G06F 3/0346* (2013.01)
*G06T 7/20* (2017.01)
*G06T 7/70* (2017.01)
*G06T 11/00* (2006.01)

(52) U.S. Cl.
CPC ............... *G06F 3/011* (2013.01); *G06T 7/20* (2013.01); *G06T 7/70* (2017.01); *G06T 11/00* (2013.01)

(56) References Cited

U.S. PATENT DOCUMENTS

| | | | |
|---|---|---|---|
| 2012/0029703 A1* | 2/2012 | Veltena | B25J 9/1615 700/275 |
| 2022/0215771 A1* | 7/2022 | Warne | G09B 9/12 |

FOREIGN PATENT DOCUMENTS

| | | | |
|---|---|---|---|
| KR | 10-2015-0101284 A | | 9/2015 |
| KR | 10-2018-0111246 A | | 10/2018 |
| KR | 20180111246 A | * | 10/2018 |
| KR | 10-2022-0007871 A | | 1/2022 |
| WO | 2020/228992 A1 | | 11/2020 |

* cited by examiner

Velocity input WV.

Acceleration input WA.

Acceleration input with tilt coordination

METHOD AND DEVICE FOR TRANSFORMING DEGREE OF FREEDOM IN MULSEMEDIA SYSTEM

CROSS-REFERENCE TO RELATED APPLICATIONS

This application is based on and claims priority under 35 U.S.C. § 119 to Korean Patent Application Nos. 10-2021-0055061 and 10-2022-0037252, filed on Apr. 28, 2021, and Mar. 25, 2022, in the Korean Intellectual Property Office, the disclosures of which are incorporated by reference herein in their entireties.

BACKGROUND

1. Field

One or more embodiments relate to a method and device for transforming degree of freedom (DoF) in a multiple sensorial media (mulsemedia) system and providing motion effects.

2. Description of the Related Art

Multiple sensorial media (mulsemedia) moves a motion platform or presents various sensory effects such as vibration, wind, scent, etc., with audiovisual content to improve users' multimedia experiences. Mulsemedia includes content such as four-dimensional (4D) films, games, virtual reality (VR), etc.

In the related art, although experts have manually produced motion effects while watching an image in accordance with content, this is problematically quite time- and cost-consuming.

SUMMARY

One or more embodiments include automatically transforming a motion of a specific object in content provided in a multiple sensorial media (mulsemedia) system in accordance with degree of freedom (DoF) of a motion platform.

One or more embodiments include automatically transforming a motion of a specific object in content provided in a mulsemedia system into a motion command implementable within a motion range of a motion platform.

One or more embodiments include solving a problem of discrepancy between a motion of an object visually sensed by a user and motion effects when the motion effects are generated based on the motion of an actual object in a mulsemedia system.

Additional aspects will be set forth in part in the description which follows and, in part, will be apparent from the description, or may be learned by practice of the presented embodiments of the disclosure.

According to one or more embodiments, a method of transforming a degree of freedom (DoF) in a multiple sensorial media (mulsemedia) system includes detecting, by a motion detector, a motion of an object to which motion effects are to be provided; calculating, by a motion proxy calculator, a motion proxy corresponding to the motion of the object; and transforming, by a transformer, the motion proxy into a motion command implementable within a motion range of a motion platform, wherein the motion proxy represents a point at which the motion of the object is transformed into a motion that matches the DoF of the motion platform, and provides three-dimensional (3D) parallel movement information and rotation information of the object.

The motion proxy may be expressed using the motion of the object in a 3D camera coordinate system and a size of the object displayed on a display, the motion of the object may be expressed in $p^{cam}$ and $d^{cam}$, and $p^{cam}$ represents a center position of the object, and $d^{cam}$ represents a unit vector in a front direction with respect to the motion platform.

$p^{cam}$ represents the parallel movement information of the object, and $d^{cam}$ represents the rotation information of the object.

the center position of the object may be expressed in $(px, py, pz)^T$, px corresponds to a roll motion command, py corresponds to a heave motion command, and pz corresponds to a pitch motion command, and the unit vector in the front direction may be expressed in $d^{cam}=(dx, dy, dz)^T$, dx corresponds to the roll motion command, dy corresponds to the heave motion command, and dz corresponds to the pitch motion command.

The transforming into the motion command may include using a motion cueing algorithm (MCA).

The MCA may include at least one of a velocity washout filter, an acceleration washout filter, and a tilt coordination acceleration washout filter.

The MCA may use at least one of model predictive control (MPC) with velocity input, MPC with acceleration input, and MPC with acceleration input and tilt coordination.

According to one or more embodiments, a method of transforming a degree of freedom (DoF) in a multiple sensorial media (mulsemedia) system includes calculating, by a motion proxy calculator, a motion proxy corresponding to a motion of an object; calculating and scaling, by a motion proxy visual velocity scaler, a visual velocity of the motion proxy according to an object-relative perception mode or a subject-relative perception mode; and transforming, by a transformer, the motion proxy whose visual velocity is scaled into a motion command implementable within a motion range of a motion platform.

The motion proxy visual velocity scaler may use the object-relative perception mode when expressing the motion of the object as motion effects with respect to the object, and in the object-relative perception mode, the visual velocity of the motion proxy relative to an image background may be calculated with respect to a local coordinate system of the user.

The motion proxy visual velocity scaler may use the subject-relative perception mode when expressing the motion of the object as motion effects as seen from a user's point of view watching the object, and in the subject-relative perception, the visual velocity of the motion proxy may be calculated with respect to a local coordinate system of the user.

In the object-relative perception mode, the visual velocity of the motion proxy may be calculated as a relative velocity between the object and an arbitrary object around the object.

In the subject-relative perception mode, the visual velocity of the motion proxy may be calculated by scaling the change in a position of the object in a two-dimensional (2D) image of successive image frames and an actual depth direction velocity of the object.

The transforming may include scaling, by a scaling unit, a size of the motion proxy whose visual velocity is scaled within a motion range of the motion platform; and applying, by a motion cueing algorithm (MCA) application unit, a MCA so as to be implementable within the motion range of the motion platform.

According to one or more embodiments, a device for transforming a degree of freedom (DoF) includes a motion detector configured to detect a motion of an object to which motion effects are to be provided in an image; a motion proxy calculator configured to calculate a motion proxy corresponding to the motion of the object; and a transformer configured to transform the motion proxy into a motion command implementable within a motion range of a motion platform, wherein the motion proxy represents a point at which 6-DoF motion of the object is reduced to a motion that matches the DoF of the motion platform, and provides three-dimensional (3D) parallel movement information and rotation information of the object.

According to one or more embodiments, a device for transforming a degree of freedom (DoF) includes a motion proxy calculator configured to calculate a motion proxy corresponding to a motion of an object; a motion proxy visual velocity scaler configured to calculate and scale a visual velocity of the motion proxy according to an object-relative perception mode or a subject-relative perception mode; and a transformer configured to transform the motion proxy whose visual velocity is scaled into a motion command implementable within a motion range of a motion platform.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
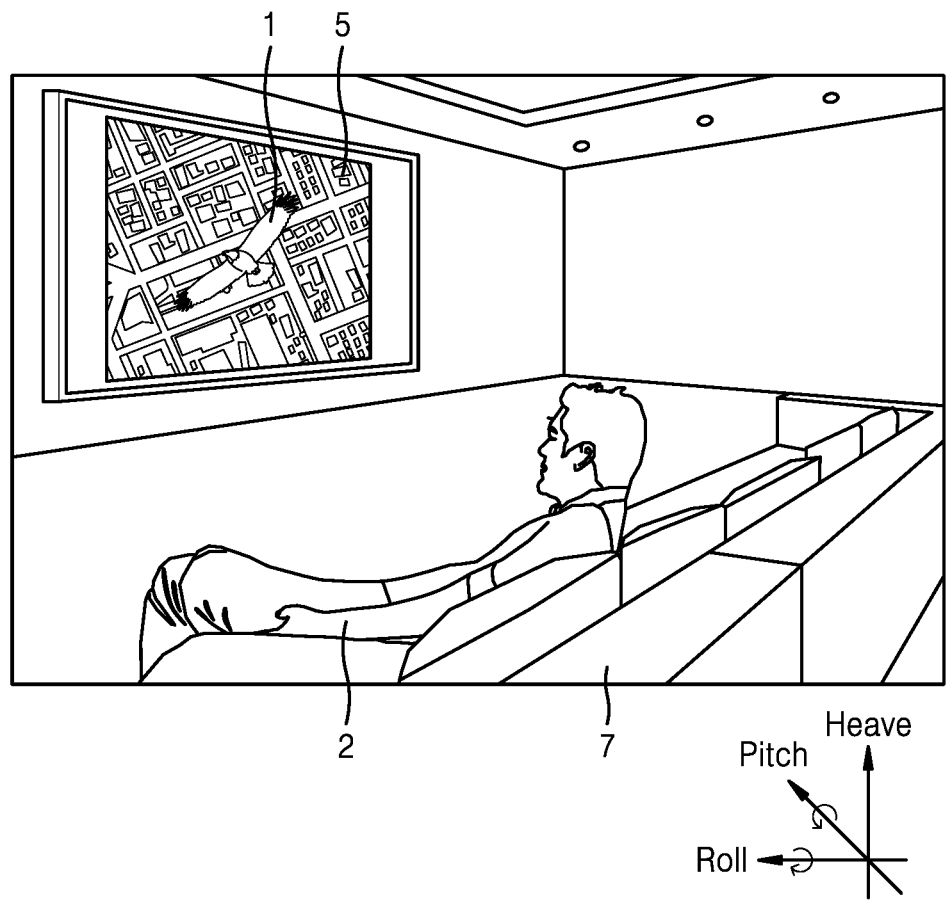
FIG. 1 shows an example of a multiple sensorial media (mulsemedia) system that provides motion effects by transforming or reducing degree of freedom (DoF) according to an embodiment of the present disclosure.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Since the present disclosure may have various changes and may have various embodiments, specific embodiments are illustrated in the drawings and described in detail in the detailed description. However, this is not intended to limit the present disclosure to specific embodiments, it should be understood to include all modifications, equivalents and substitutes included in the spirit and scope of the present disclosure. In describing each figure, like reference numerals have been used for like elements.

Hereinafter, embodiments according to the present disclosure will be described in detail with reference to the accompanying drawings.

FIG. 1 shows an example of a multiple sensorial media (mulsemedia) system 10 that provides motion effects by transforming or reducing a degree of freedom (DoF) according to an embodiment of the present disclosure. According to an embodiment of the present disclosure, the mulsemedia system 10 includes a four-dimensional (4D) platform, a game platform, a virtual reality (VR) platform, etc. The 4D platform is an immersive entertainment system that presents various physical effects such as motion, vibration, wind, water, and scent, with audiovisual content, to improve a multimedia experience of a user 2.

Referring to FIG. 1, in an embodiment of the present disclosure, a motion command that transforms or reduces multiple DoFs of an object 1 in an image provided in audiovisual content of the mulsemedia system 10 in accordance with a DoF of a motion platform 7 is provided.

Figure 3:
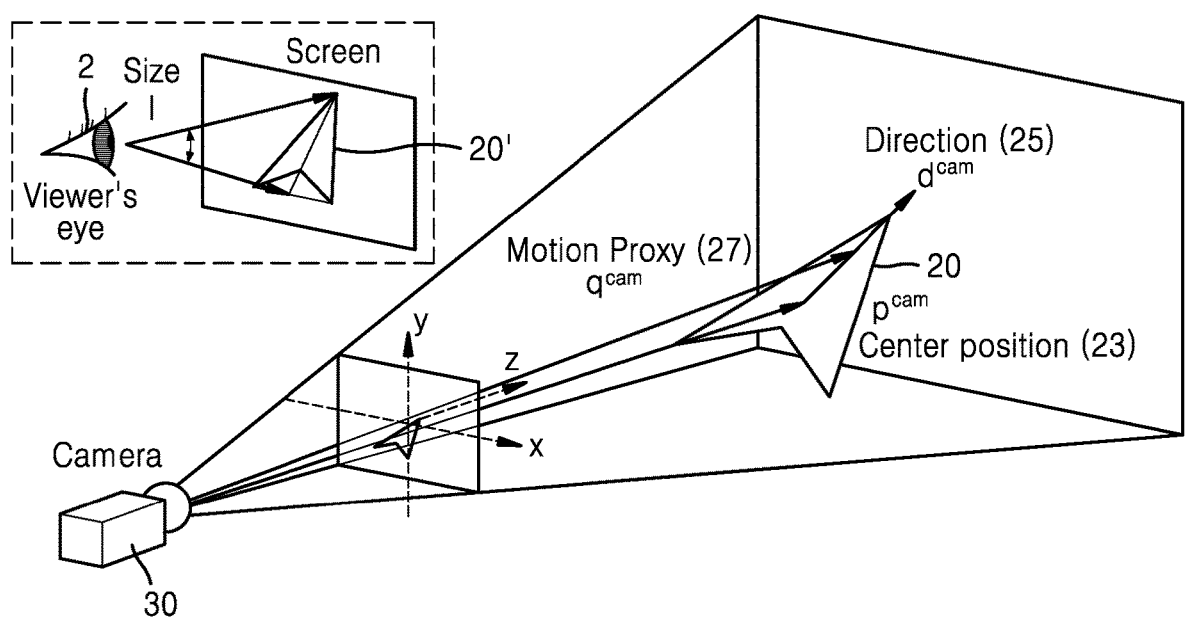
FIG. 3 shows an example of expressing an object in a three-dimensional (3D) camera space according to an embodiment of the present disclosure.

The object 1 has 6-DoF motion in a three-dimensional (3D) camera space as in an embodiment of FIG. 3. Meanwhile, the motion platform 7 may express motion of two DoFs, three DoFs, four DoFs, and six DoFs according to a DoF of a movable axis. Two DoFs provide roll and pitch. Three DoFs provide roll, pitch and heave. Four DoFs provide roll, pitch, heave, and sway. Six DoFs provide motion in all directions.

Referring to FIG. 1, the mulsemedia system 10 includes a screen 6 displaying an image 5 and the motion platform 7. The screen 6 includes various types of displays. The motion platform 7 is also known as a motion simulator. The mulsemedia system 10 may provide a motion command to the motion platform 7 according to the motion of the object 1 to provide motion effects in the image 5. When the motion command is transmitted to the motion platform 7, the motion command is reproduced as motion effects. In this case, the motion command may be reproduced in real time or with content that has been previously generated and reproduced on the screen 6. Table 1 shows, according to an embodiment of the present disclosure, a center position of the object 1 and a unit vector of the object 1 in a front direction provided with respect to a movement and rotation of the object 1. In Table 1, position(x, y, z) indicates the center position of the object 1, and direction(x, y, z) indicates the unit vector of the object 1 in the front direction with respect to the motion platform 7.

TABLE 1

| time | position(x) | position(y) | position(z) | direction(x) | direction(y) | direction(z) |
|------|-------------|-------------|-------------|--------------|--------------|--------------|
| 0.02 | 27.69 | 19.89 | 2.09 | −0.98 | 0.08 | 0.17 |
| 0.04 | 28.52 | 98.11 | 17.44 | 0.54 | −0.84 | −0.82 |
| 0.06 | 78.26 | 53.44 | 77.77 | 0.92 | −0.33 | −0.51 |
| 0.08 | 66.35 | 97.82 | 86.84 | 0.86 | −0.47 | −0.37 |
| 0.10 | 64.88 | 98.86 | 82.88 | −0.29 | −0.95 | 0.61 |
| 0.12 | 17.70 | 71.75 | 36.35 | −0.75 | 0.66 | −0.81 |

...

Figure 2:
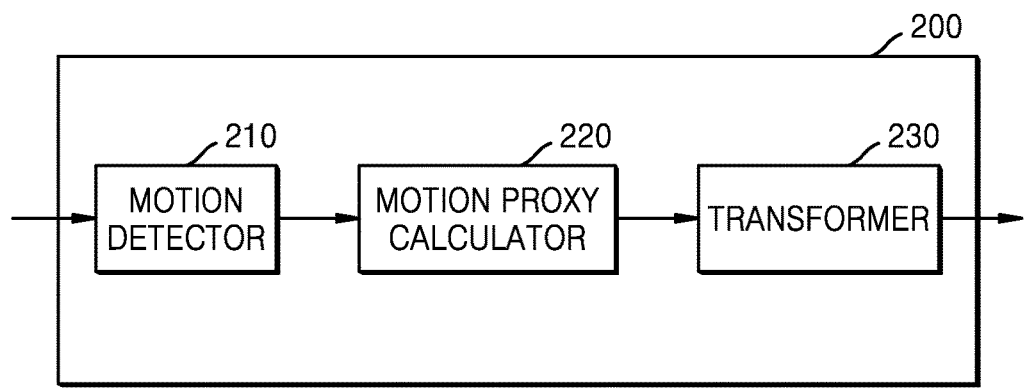
FIG. 2 is an internal configuration diagram of a device for transforming a DoF according to an embodiment of the present disclosure.

FIG. 2 is an internal configuration diagram of a device 200 for transforming a DoF according to an embodiment of the present disclosure.

According to an embodiment of the present disclosure, the device 200 for transforming the DoF expresses parallel movement and rotation of an object within a limited DoF of a motion platform by using a motion proxy. In this process, amplitudes of motion effects may be adjusted by adjusting (the size of) the motion proxy according to the size of the object. And, a motion command implementable within a motion range of the motion platform is generated by using a motion cueing algorithm.

Assume that a motion platform that expresses only motion of three DoFs is installed in a theater. According to an embodiment of the present disclosure, the device 200 for transforming the DoF generates motion effects obtained by transforming six DoFs of the object to three DoFs in accordance with the DoF of the motion platform.

The device 200 for transforming the DoF includes a motion detector 210, a motion proxy calculator 220, and a transformer 230.

The motion detector 210 detects a motion of an object to which motion effects are to be provided in an image.

When data about motion of an object is not previously stored during producing content used in the mulsemedia system 10, the motion detector 210 may detect the motion of the object by using computer vision technology, etc.

When motion information of the object is stored by using a motion sensor capable of sensing the motion during producing the content, the motion detector 210 uses the previously stored motion information. In the case of content produced through a simulation engine, such as a game or animation, information about motion of the main object 1 is directly extracted from the simulation engine. Here, the simulation engine includes Unity3D, Unreal Engine, Adobe Flash Player, etc. The motion detector 210 may use the information about the motion extracted from the simulation engine.

The motion proxy calculator 220 calculates a motion proxy corresponding to the motion of the object. The motion proxy represents a point where 6-DoF motion of an object is reduced or transformed to a motion that matches DoF in accordance with a motion platform, and provides 3D parallel movement information and rotation information of the object. Refer to Equation 2 for a formula for calculating the motion proxy.

When the object moves from a first position to a second position, the motion proxy calculator 220 calculates a first motion proxy $q^{cam1}$ at the first position and a second motion proxy $q^{cam2}$ at the second position of the object. When the object moves from a first time t1 to a second time t2, the motion proxy calculator 220 calculates a continuous motion proxy $q^{cam}$ according to a time between the first time t1 and the second time t2.

The transformer 230 transforms the motion proxy calculated by the motion proxy calculator 220 into a motion command $m_n$ implementable within a limited motion range of the motion platform. For example, the motion platform 7 has the limited motion range, such as within 10 degrees of a rotation axis, within 5 cm of a translation axis, etc. To this end, the transformer 230 may use the motion cueing algorithm.

For example, when the object moves from the first position to the second position, the transformer 230 transforms the motion between the first motion proxy $q^{cam1}$ and the second motion proxy $q^{cam2}$ into the motion command using the motion cueing algorithm. When the object moves from the first time t1 to the second time t2, the transformer 230 transforms the continuous motion proxy $q^{cam}$ in a period between the t1 and the second time t2 into the motion command using the motion cueing algorithm.

The motion cueing algorithm controls the maximum displacement and maximum velocity to reproduce a given motion within limitations of the motion platform 7. Equations 4 to 7 show an example of the motion cueing algorithm used by the transformer 230. The transformer 230 may also use three types of washout filters shown in FIGS. 6A to 6C in order to use the motion cueing algorithm. The transformer 230 may also use model predictive control (MPC) with velocity input, MPC with acceleration input, and MPC with tilt coordination described in relation to Equations 6 to 7.

FIG. 3 shows an example of expressing an object 20 in a three-dimensional (3D) camera space according to an embodiment of the present disclosure.

In FIG. 3, x, y, and z denote axes in the left, right, up, down, and front and rear directions in a coordinate system of a camera 30, respectively. In the coordinate system of the camera 30, the object 20 has 6-DoF motion and is projected and displayed on a two-dimensional (2D) screen 28.

The motion of the object 20 in the coordinate system of the camera 30 is expressed by $p^{cam}$ 23 and $d^{cam}$ 25. $p^{cam}$ 23 is expressed as $p^{cam}=(px, py, pz)^T$, and represents a center position of a bounding box of the object 20. The bounding box of the object 20 refers to a box with a minimum size that may include all forms of the object 20.

px may be mapped to a roll motion command, py to a heave motion command, and pz to a pitch motion command.

$d^{cam}$ 25 is expressed as $d^{cam}=(dx, dy, dz)^T$, and represents a unit vector in a front direction with respect to the motion platform (FIGS. 1 and 7). dx may be mapped to a roll motion command, py to a heave motion command, and pz to a pitch motion command.

In addition, the size I of the object 20' indicates the visual size of the object 20' that is projected to the two-dimensional screen 28 and shown to the user.

Parallel movement information of the object 20 may be identified through $p^{cam}$, and rotation information of the object 20 may be identified through $d^{cam}$. In addition, the amplitude of each motion effect due to the parallel movement and rotation of the object 20 varies according to a size I of an object 20'.

In the coordinate system of the camera 30, the object 20 may move and rotate freely and thus have 6-DoF motion, but in contrast, the motion platform (FIGS. 1 and 7) has n limited DoFs expressed in a motion command $m_n$ ($m_2$=(roll, pitch)$^T$, $m_3$=(roll, pitch, heave)$^T$, $m_4$=(roll, pitch, sway, heave)$^T$, $m_6$=(roll, pitch, yaw, surge, sway, heave)$^T$). Therefore, a process of reducing or transforming the 6-DoF motion of the object 20 expressed in the coordinate system of the camera 30 into the DoF of the motion platform is required.

According to an embodiment of the present disclosure, a case in which the DoF of the motion platform is less than six DoFs will be described. In the case of a motion platform with two DoFs, three DoFs, and four DoFs, motion commands with DoFs that may not be expressed are replaced with motion commands with DoFs that may be expressed.

FIGS. 4A to 4D show motion of replaceable DoF according to an embodiment of the present disclosure. FIG. 5 is a diagram showing a DoF replacement rule according to an embodiment of the present disclosure.

Figure 4A:
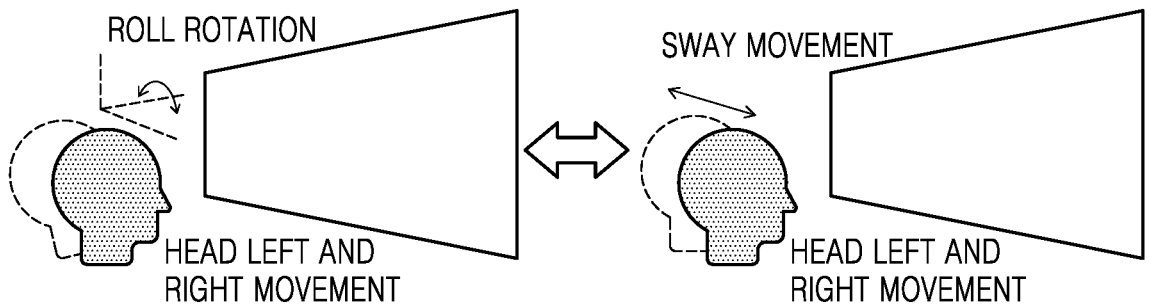
FIGS. 4A to 4D show motion of replaceable DoF according to an embodiment of the present disclosure.
Figure 5:
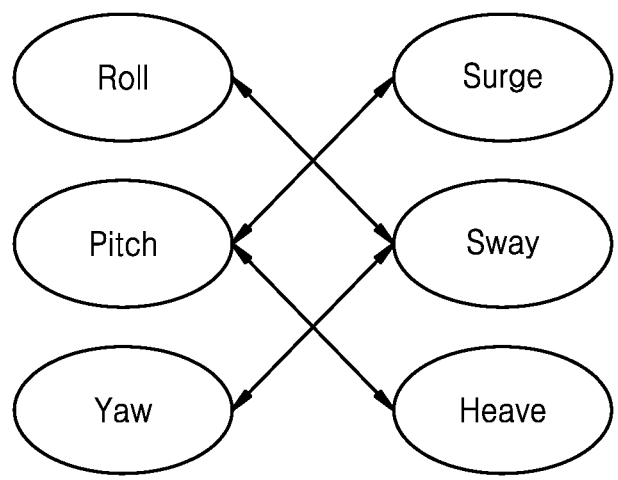
FIG. 5 is a diagram showing a DoF replacement rule according to an embodiment of the present disclosure.

Referring to FIG. 4A, a roll command may be replaced with a sway command because the user's head may move in the left and right directions.

Figure 4B:
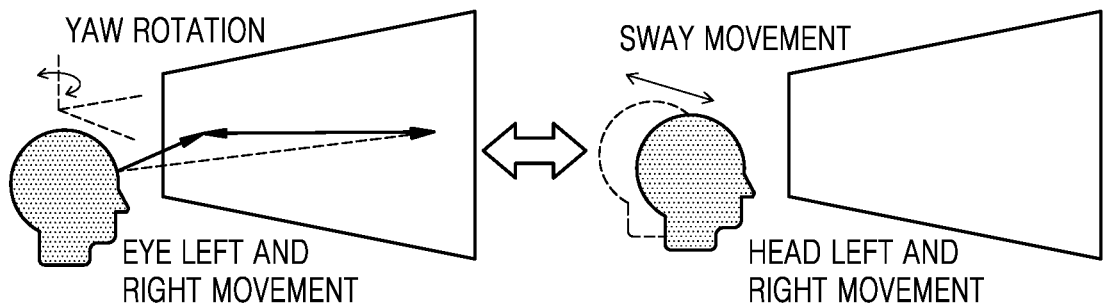

Referring to FIG. 4B, z rotation command in z yaw direction may be replaced with a sway command because the user's gaze may move in the left and right directions of z screen.

Figure 4C:
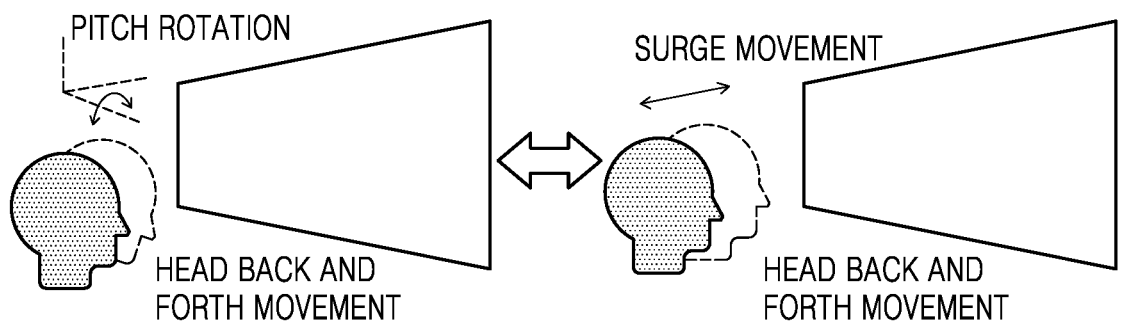

Referring to FIG. 4C, z pitch command may be replaced with a surge command because the user's head may move in the forward and backward directions.

Figure 4D:
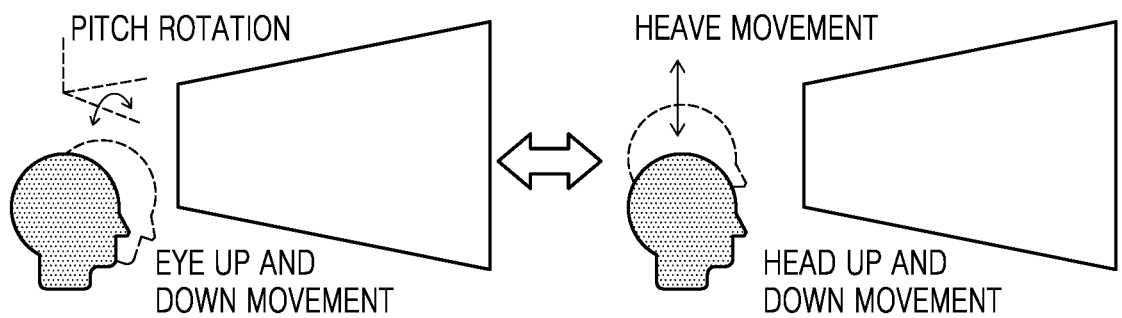

Referring to FIG. 4D, a pitch command may be replaced with a heave command because the user's gaze may move up and down. The reverse replacement is also possible.

Based on the above replacement process, the motion command $m_n$ of n DoFs may be expressed as in Equation 1.

$$m_n = w_T(l)A_n(p^{cam} - p_0^{cam}) + w_R(l)B_n(d^{cam} - d_0^{cam}) \quad \text{[Equation 1]}$$

$$m_6 = \begin{pmatrix} \text{roll} \\ \text{pitch} \\ \text{yaw} \\ \text{surge} \\ \text{sway} \\ \text{heave} \end{pmatrix}, A_6 = \begin{pmatrix} 0 & 0 & 0 \\ 0 & 0 & 0 \\ 0 & 0 & 0 \\ 0 & 0 & 1 \\ 1 & 0 & 0 \\ 0 & 1 & 0 \end{pmatrix}, B_6 = \begin{pmatrix} 1 & 0 & 0 \\ 0 & 0 & 1 \\ 1 & 0 & 0 \\ 0 & 0 & 0 \\ 0 & 0 & 0 \\ 0 & 1 & 0 \end{pmatrix}$$

$$m_4 = \begin{pmatrix} \text{roll} \\ \text{pitch} \\ \text{surge} \\ \text{heave} \end{pmatrix}, A_4 = \begin{pmatrix} 0 & 0 & 0 \\ 0 & 0 & 1 \\ 1 & 0 & 0 \\ 0 & 1 & 0 \end{pmatrix}, B_4 = \begin{pmatrix} 1 & 0 & 0 \\ 0 & 0 & 1 \\ 0 & 0 & 0 \\ 0 & 1 & 0 \end{pmatrix}$$

$$m_3 = \begin{pmatrix} \text{roll} \\ \text{pitch} \\ \text{heave} \end{pmatrix}, A_3 = \begin{pmatrix} 1 & 0 & 0 \\ 0 & 0 & 1 \\ 0 & 1 & 0 \end{pmatrix}, B_3 = \begin{pmatrix} 1 & 0 & 0 \\ 0 & 0 & 1 \\ 0 & 1 & 0 \end{pmatrix}$$

$$m_2 = \begin{pmatrix} \text{roll} \\ \text{pitch} \end{pmatrix}, A_2 = \begin{pmatrix} 1 & 0 & 0 \\ 0 & 1 & 1 \end{pmatrix}, B_2 = \begin{pmatrix} 1 & 0 & 0 \\ 0 & 1 & 1 \end{pmatrix}$$

In Equation 1, n denotes DoFs, and An and Bn denote matrices used to obtain a motion proxy that matches a motion platform of n DoFs. In two, three, four, and six DoFs, An and Bn are the same as in Equation 1.

In Equation 1, $w_T$ and $w_R$ are scale factors that determine the amplitude of the motion effect with respect to parallel movement and rotation according to the size I of an object. $P_0^{cam}$ and $d_0^{cam}$ respectively denote the center position $p^{cam}$ 23 of the object and the unit vector $d^{cam}$ 25 in the front direction at the time when the object is first detected on the camera coordinate system. $P_0^{cam}$ and $d_0^{cam}$ are used as initial values for starting the motion command from a neutral position of a motion chair.

According to an embodiment of the present disclosure, the 6-DoF motion of the object may be transformed into a motion proxy that matches the DoF of a motion platform. A motion proxy represents a point at which the 6-DoF motion of the object is reduced to a motion that matches the DoF of the motion platform.

The motion proxy $q^{cam}$ of the object is expressed as in Equation 2, and reflects both the 3D parallel movement information and the rotation information of the object.

$$q^{cam} = A_n p^{cam} + (w_R(I)/w_T(I))B_n d^{cam} \quad \text{[Equation 2]}$$

The motion proxy $q^{cam}$ 27 indicates a point moved in the front direction by $(w_R(I)/w_T(I))$ from the center position $p^{cam}$ of the object. The size of motion effects with respect to the rotation of the object is adjusted according to a distance moved in the front direction by $(w_R(I)/w_T(I))$. The motion proxy cram 27 includes a weighted sum of a center position vector and a direction vector of the object, thereby reflecting the 6-DoF motion of the object. In an embodiment, the greater the distance moved in the front direction from the central position of the object, the more the rotational movement is reflected. The scale factors $w_R$ and $w_T$ may be determined according to the object size I and thus, the amplitude of motion effects with respect to rotation and parallel movement may be adjusted.

Substituting Equation 2 into Equation 1 may be simplified as in Equation 3.

$$m_n = w_T(l)(q^{cam} - q_0^{cam}) \quad \text{[Equation 3]}$$

In the case of Equation 3, when the motion command is calculated by multiplying only the scale factor $w_T(I)$ by the motion proxy of the object, a motion range of the motion platform may be deviated. In order to solve this problem, a motion command is generated by applying a motion cueing algorithm as shown in Equation 4. The motion cueing algorithm includes a washout filter and MPC. In addition, when tilting the motion platform 7, the motion cueing algorithm also includes tilt coordination, which is a control method that considers acceleration due to tilt.

In Equation 4, a motion cueing algorithm (MCA) transforms the motion of the motion proxy to be expressed within the motion range of the motion platform. In this process, each element of the motion proxy may be differentiated or scaled. Equation 4 shows an example of using the MCA with velocity as an input. The velocity may be expressed as a derivative of cram.

$$m_n = \text{MCA}_v(q^{cam\prime})$$

Equation 5 shows an example of using the MCA with acceleration as an input. The acceleration may be expressed as a second derivative of $q^{cam}$.

$$m_n = \text{MCA}_a(q^{cam\prime}) \quad \text{[Equation 5]}$$

Figure 6A:
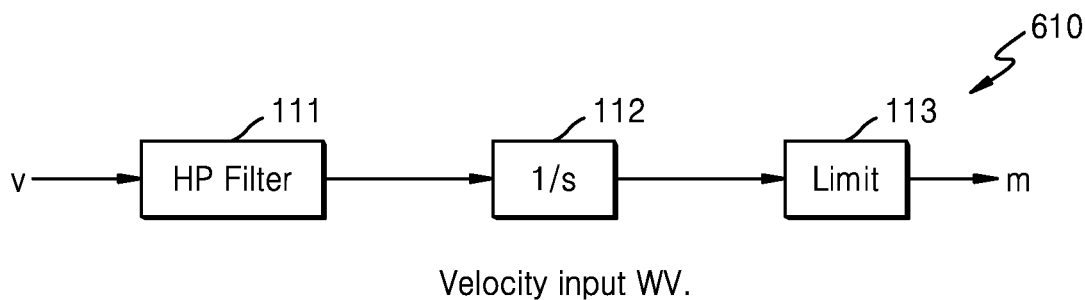
FIGS. 6A to 6C are configuration diagrams of three washout filters used in a transformer of a device for transforming a DoF according to an embodiment of the present disclosure.
Figure 6B:
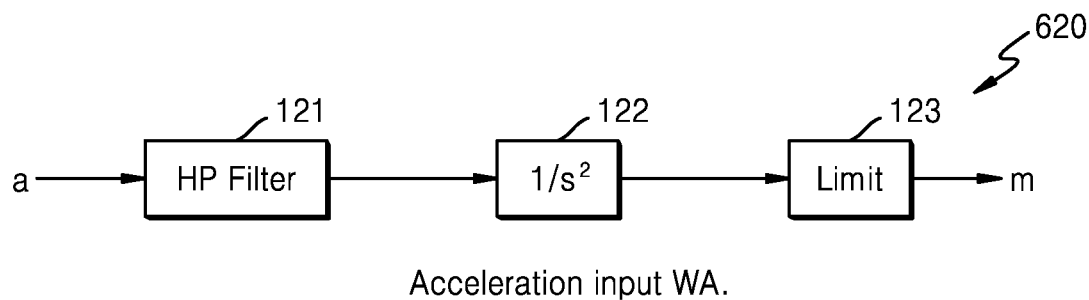
Figure 6C:
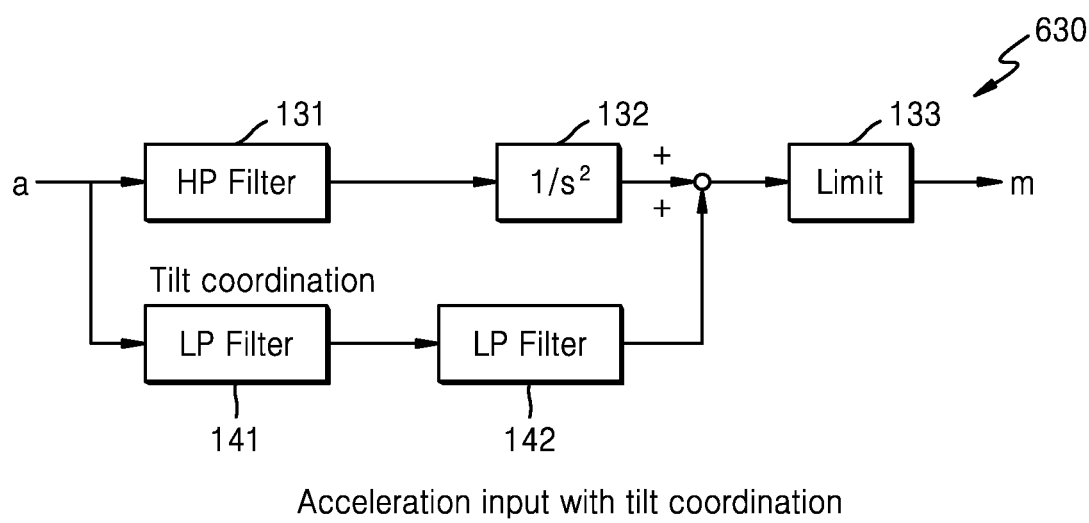

FIGS. 6A to 6C are configuration diagrams of three washout filters used in a transformer of a device for transforming a DoF according to an embodiment of the present disclosure. The three washout filters include a velocity washout filter WV 610, an acceleration washout filter WA 620, and a tilt coordination acceleration washout filter WAT 630.

FIG. 6A shows the velocity washout filter WV 610 using a velocity as an input according to an embodiment of the present disclosure. The velocity washout filter WV 610 includes a high-pass filter 111, an integrator 112, and a limiter 113. The high-pass filter 111 includes a Butterworth high-pass filter.

The velocity washout filter WV 610 receives a velocity value v as an input and outputs a motion command m. The velocity value v is input to the high-pass filter 111. The high-pass filter 111 has a cutoff frequency of 1.0 Hz. The integrator 112 integrates the filtered velocity, and the motion command is limited not to exceed the motion range of the motion platform in the limiter 113 and then calculated.

FIG. 6B shows the acceleration washout filter WA 620 using an acceleration as an input according to an embodiment of the present disclosure. The acceleration washout filter WA 620 includes a high-pass filter 121, a double integrator 122 and a limiter 123. The high-pass filter 121 includes a Butterworth high-pass filter. The acceleration washout filter WA 620 receives the acceleration value a as an input and outputs the motion command m. The acceleration value a is transferred to the high-pass filter 111 with a cutoff frequency of 2.5 Hz, and then is double-integrated in a double integrator 122. Thereafter, the motion command is calculated not to exceed the motion range of the motion platform in the limiter 123. The acceleration washout filter WA 620 is different from the velocity washout filter WV 610 in that the initial velocity is regarded as 0.

FIG. 6C shows the tilt coordination acceleration washout filter WAT 630 using an acceleration with tilt coordination as an input according to an embodiment of the present disclosure. The tilt coordination acceleration washout filter WAT 630 is a combination of the acceleration washout filter WA (620) and tilt coordination.

Tilt coordination is a technique that simulates continuous acceleration such as gravity and centrifugal force by tilting a motion platform for a relatively long time. For example, a tilting angle of θ induces an acceleration of gθ, where g is the gravitational constant. This technique is generally implemented with a low-pass filter 141, and the filtered output is rate-limited (142) to prevent sensation of rotation. In the tilt coordination acceleration washout filter WAT 630, the acceleration divided by g is supplied to the first-order Butterworth low-pass filter 141 with a cutoff frequency of 0.1 Hz, and the maximum rate is set to 1/s (142). The motion command of the tilt coordination acceleration washout filter WAT 630 is obtained by adding the motion command of the acceleration washout filter WA 620 to this filtered acceleration.

As another embodiment of the present disclosure, the transformer of the device for transforming the DoF may implement a MCA using MPC. Even when MPC is used, three types of MPC with velocity input, MPC with acceleration input, and MPC with perceived acceleration input and tilt coordination may be designed.

The MPC with velocity input is expressed as Equation 6.

$$m = \operatorname*{argmin}_{m} \|v - v_m\|^2 \quad \text{[Equation 6]}$$

$$\text{subject to } m(t) = \int_0^t v_m(t')dt', \ |m(t)| < m_{max}$$

In Equation 6, v denotes the velocity, $v_m$ denotes the velocity of the motion command, m denotes the motion command, and $m_{max}$ denotes the maximum displacement of the motion platform.

MPC with acceleration input is expressed as Equation 7. Equation 7 uses a human vestibular perception model as a processing model. Surge, sway, and heave, which are components of parallel movement information, use an otolith organ perception model, and roll, pitch, and yaw, which are components of rotation information, use a semicircular canal perception model.

$$m = \operatorname*{argmin}_{m} \|\hat{a} - \hat{a}_m\|^2 \quad \text{[Equation 7]}$$

$$\text{subject to } \dot{x}(t) = Ax(t) + Ba(t),$$

$$\hat{a}(t) = Cx(t)$$

$$\dot{x}_m(t) = Ax_m(t) + Ba_m(t),$$

$$\hat{a}_m(t) = Cx_m(t),$$

$$m(t) = \int_0^t \int_0^{t'} a_m(t'')dt''dt',$$

$$|m(t)| < m_{max}$$

In Equation 7, $a_m$ denotes an acceleration of a motion command, and x denotes a state vector. A, B, and C show the vestibular perception model in state-space representation.

MPC with perceived acceleration input and tilt coordination is obtained by adding tilt coordination to Equation 7. MPC with perceived acceleration input and tilt coordination replaces B $a_m$(t) term in Equation 7 with B ($a_m$(t)+m(t) g/R) only in the case of roll and pitch to obtain the optimized motion command. Here, g denotes the gravitational constant, and R denotes the length from the rotation center of the motion platform to the user's head.

Figure 7:
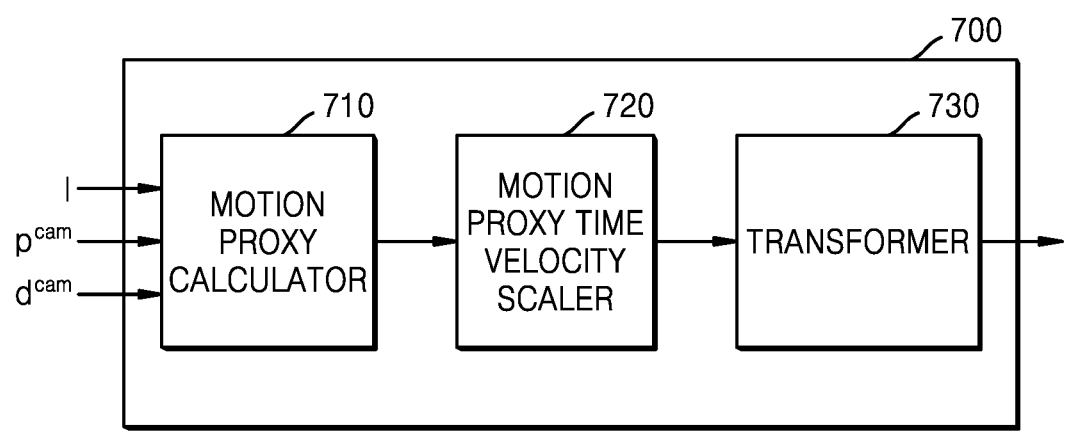
FIGS. 7 and 8 are internal configuration diagrams of devices for transforming a DoF according to another embodiment of the present disclosure.

FIG. 7 is an internal configuration diagram of a device 700 for transforming a DoF according to another embodiment of the present disclosure.

The device 700 for transforming the DoF includes a motion proxy calculator 710, a motion proxy time velocity scaler 720, and a transformer 730.

The motion proxy calculator 710 calculates a motion proxy corresponding to the motion of an object. This refers to the description of FIG. 2.

The motion proxy visual velocity scaler 720 calculates and scales the visual velocity of the motion proxy according to a subject-relative perception mode or an object-relative perception mode.

Figure 9A:
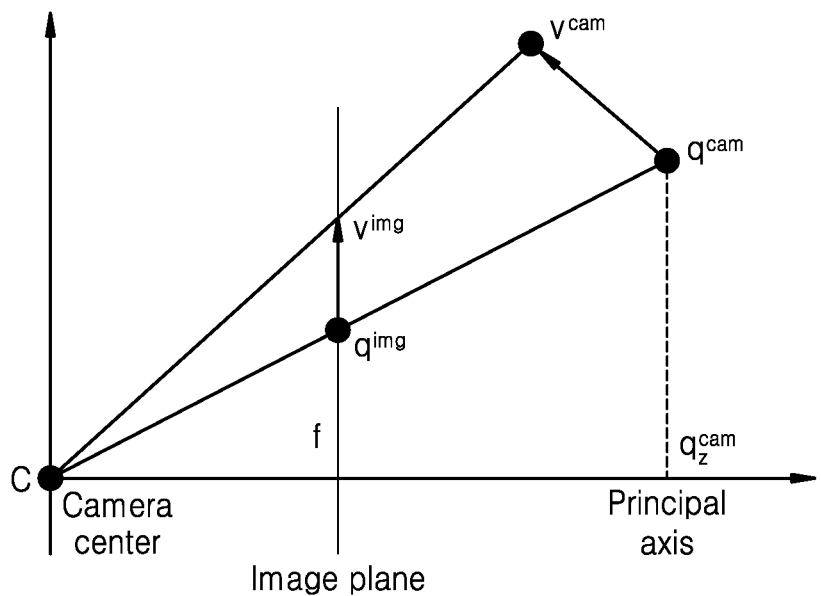
FIGS. 9A and 9B show horizontal and vertical components and a depth component of a visual velocity of an object of a motion proxy according to an embodiment of the present disclosure.
Figure 9B:
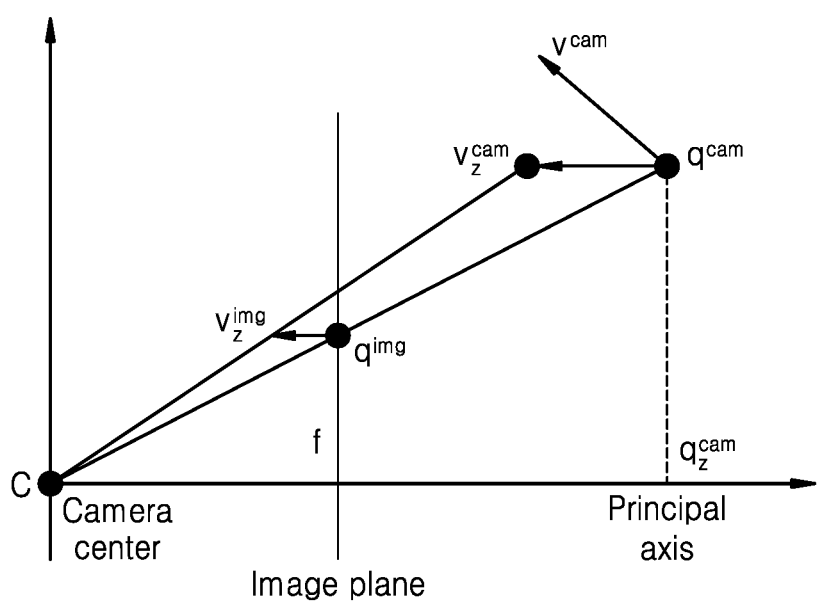

In a mulsemedia system, a user perceives a motion of the object through vision. However, since the motion of the object perceived through vision does not perfectly match the motion of an actual object, there is a possibility that creating motion effects based on the actual motion leads to discrepancies between the visually-perceived motion and the motion effects FIGS. 9A and 9B show an example of discrepancy. FIG. 9A shows horizontal and vertical components of the visual velocity of an object in a visual perception model. FIG. 9B shows a depth component of the object in the visual perception model.

In order to solve this problem, the motion proxy visual velocity scaler 720 calculates the motion of an object visually perceived by the user based on visual perception and motion field equations, and scales the visual velocity of the motion proxy.

To this end, the motion proxy visual velocity scaler 720 may use a visual perception model. The visual perception model includes a subject-relative perception mode and an object-relative perception mode.

The motion proxy visual velocity scaler 720 uses the subject-relative perception mode when expressing the motion of the object as motion effects as seen from the user's point of view watching the object. In the subject-relative perception mode, the visual velocity of the motion proxy is calculated with respect to a user's local coordinate system. The visual velocity of the motion proxy in the subject-relative perception mode is expressed as $v^{sub}$, and a horizontal component $v_x^{sub}$ and a vertical component $v_y^{sub}$ of $v^{sub}$ are calculated as a change in the position of the object in a 2D image of successive image frames. A depth component $v_z^{sub}$ is calculated by scaling the actual depth direction velocity of the object.

The motion proxy visual velocity scaler 720 uses an object-relative perception mode when expressing the motion of the object as motion effects with respect to the object. The object-relative perception mode calculates the visual velocity of the motion proxy relative to an image background with respect to the user's local coordinate system. In a local coordinate system of the object, the visual velocity of the motion proxy calculates $v^{obj}$, which represents the relative velocity between the object and a background of the object. As shown in Equation 8, $v^{obj}$ is calculated by subtracting a velocity of the background corresponding to the position of the object from the visual velocity of the motion proxy calculated in the subject-relative perception mode. In other words, in the object-relative perception mode, the visual velocity of the motion proxy is calculated as the relative velocity between the object and an arbitrary object around the object.

$$v^{obj} = v^{sub} - v^{bg} \quad \text{[Equation 8]}$$

For the description of the user local coordinate system and the object local coordinate system, it is assumed that the user faces a screen on which the object is displayed. When the object moves to the left on the screen, the motion of the object is the left in the object local coordinate system, and the motion of the object is the right in the user local coordinate system.

The transformer 730 transforms the motion proxy whose visual velocity is scaled into the motion command $m_n$ implementable within the motion range of the motion platform. According to an embodiment of the present disclosure, the transformer 730 includes a scaling unit (not shown) and an MCA application unit (not shown).

The scaling unit adjusts the size of the motion proxy whose visual velocity is scaled within the motion range of the motion platform. The scaling unit adjusts the size so that the calculated motion proxy becomes motion effects of a predetermined size. The predetermined size may be selected as a value between the maximum displacement and the minimum displacement of the motion proxy within an allowable motion range of the motion platform.

Thereafter, a MCA is applied so as to be implemented by the MCA application unit within the motion range of the motion platform. For an example of applying the MCA, refer to the description of the transformer 730 of FIG. 2.

Figure 8:
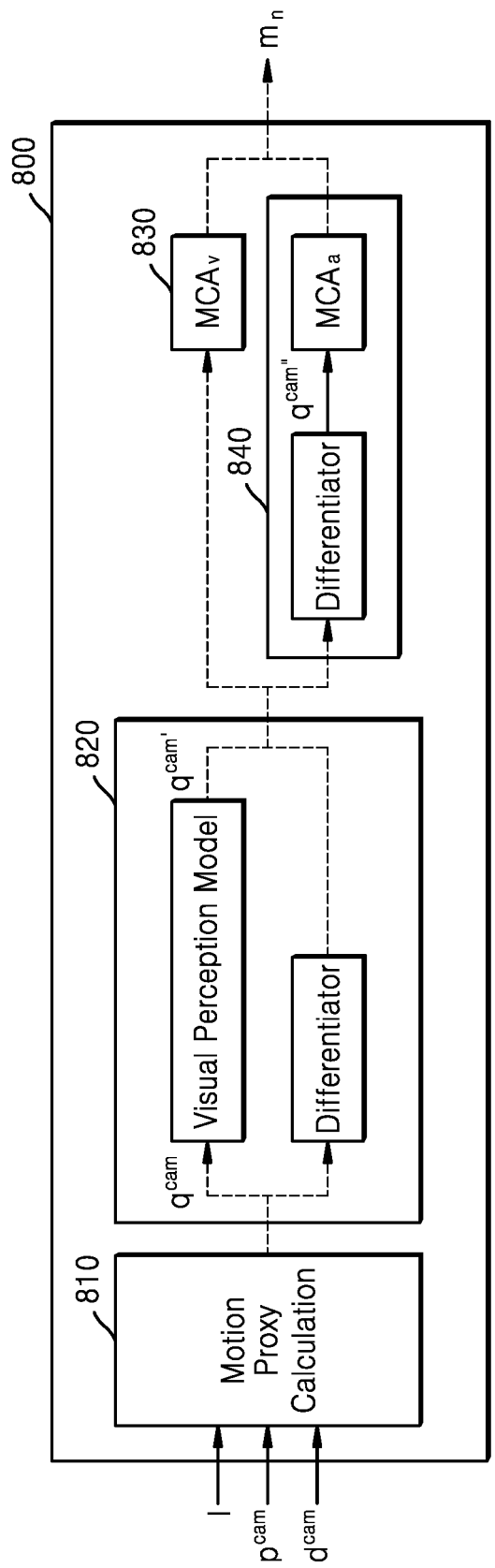

FIG. 8 is an internal configuration diagram of a device 800 for transforming a DoF according to another embodiment of the present disclosure.

The device 800 for transforming the DoF includes a motion proxy calculator 810, a motion proxy visual velocity scaler 820, a transformer 830, and a motion proxy acceleration scaler 840.

The functions of the motion proxy calculator 810, the motion proxy visual velocity scaler 820, and the transformer 830 are substantially similar to those of FIG. 7, and thus refer to the description of FIG. 7. The motion proxy visual velocity scaler 820 reflects a visual perception model, calculates a velocity value by differentiating a change amount of a position, and uses a velocity value as an input value of a MCA as in Equation 5.

The motion proxy acceleration scaler 840 calculates an acceleration value by differentiating the velocity value obtained by differentiating the motion proxy $q^{cam}$ once more. The acceleration value is used as the input value of the MCA as shown in Equation 6.

Figure 10:
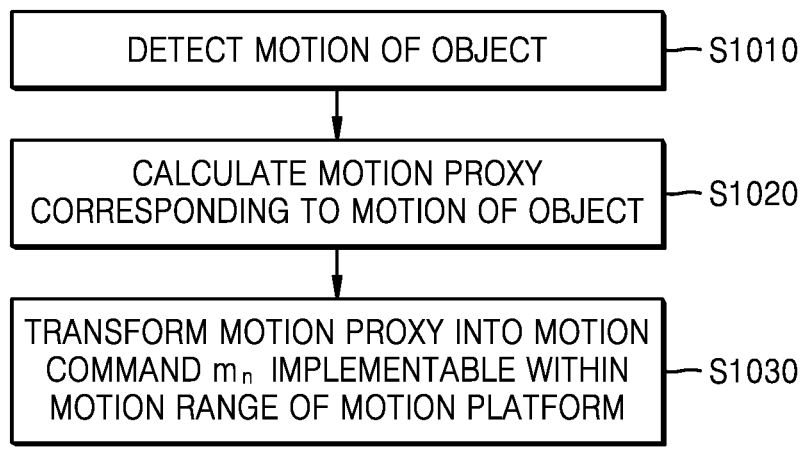
FIG. 10 is a flowchart of a method of transforming a DoF according to an embodiment of the present disclosure.

FIG. 10 is a flowchart of a method of transforming a DoF according to an embodiment of the present disclosure.

A motion detector detects a motion of an object to which motion effects are to be provided (S1010). The motion proxy calculator calculates a motion proxy corresponding to the motion of the object as shown in Equation 2 (S1020). A transformer transforms the motion proxy into the motion command mn implementable within a motion range of a motion platform (S1030). In this case, Equations 3 to 8 may be used.

Figure 11:
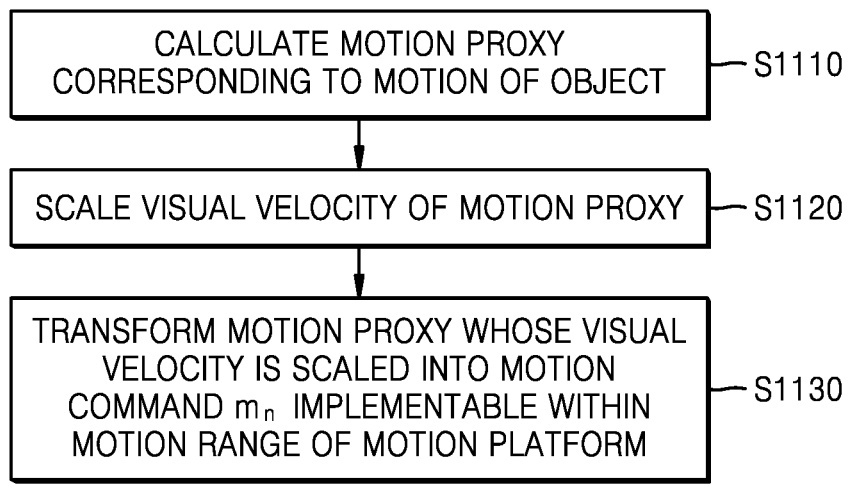
FIG. 11 is a flowchart of a method of transforming a DoF according to another embodiment of the present disclosure.

FIG. 11 is a flowchart of a method of transforming a DoF according to another embodiment of the present disclosure.

A motion proxy calculator calculates a motion proxy corresponding to a motion of an object as shown in Equation 2 (S1110). A motion proxy visual velocity scaler calculates a visual velocity of the motion proxy according to the object-relative perception mode or the subject-relative perception mode to scale a discrepancy caused by a difference between the actual object motion and the user's vision (S1120).

A transformer transforms the motion proxy whose visual velocity is scaled into the motion command mn implementable within a motion range of a motion platform (S1130).

The operation of the method according to an embodiment of the present disclosure may be implemented as a computer-readable program or code on a computer-readable recording medium. The computer-readable recording medium includes all types of recording devices in which information readable by a computer system is stored. In addition, the computer-readable recording medium may be distributed in a network-connected computer system to store and execute computer-readable programs or codes in a distributed manner.

In addition, the computer-readable recording medium may include a hardware device specially configured to store and execute program instructions, such as ROM, RAM, and flash memory. Some or all of operations of the method of transforming the DoF disclosed in the present disclosure may be performed, for example, by (or using) a hardware device such as a microprocessor, a programmable computer, or an electronic circuit.

In an embodiment of the present disclosure, there is an effect of reducing the time and effort required to produce motion effects by automatically transforming the motion of a specific object in the content provided by the mulsemedia system in accordance with the DoF of the motion platform. In addition, there is an effect of generating motion effects by analyzing an image in real time.

There is an effect of automatically generating the motion of a specific object in the content provided by the mulsemedia system as a motion command implementable within the motion range of the motion platform.

When motion effects are generated based on the motion of an actual object in the mulsemedia system, there is an effect of solving the problem of discrepancy between the motion of an object visually sensed by the user and the motion effects. As a result, realistic motion effects that elaborately express the motion of the object may be generated.

In an embodiment of the present disclosure, the method of transforming the DoF in the mulsemedia system may be applied to various mulsemedia such as 4D rides, home theater systems, and home games as well as 4D films.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. A method of transforming a degree of freedom (DoF) in a multiple sensorial media (mulsemedia) system, the method comprising:
   detecting, by a motion detector, a motion of an object to which motion effects are to be provided;
   calculating, by a motion proxy calculator, a motion proxy corresponding to the motion of the object, using an object size (I) displayed on a display; and
   transforming, by a transformer, the motion proxy into a motion command implementable within a motion range of a motion platform,
   wherein the motion proxy represents a point at which the motion of the object is transformed into a motion that matches the DoF of the motion platform, and provides three-dimensional (3D) parallel movement information and rotation information of the object,
   wherein, the motion proxy $q^{cam}$ of the object is expressed as $$q^{cam}=A_n p^{cam}+(w_R(I)/w_T(I))B_n d^{cam}$$

wherein $A_n$ and $B_n$ denote matrices used to obtain a motion proxy that matches a motion platform of n DoFs,
   wherein a size of motion effects with respect to a rotation of the object is adjusted to a distance moved in a front direction by $(w_R(I)/w_T(I))$,
   wherein scale factors $w_R$ and $W_T$ are determined according to the object size (I) displayed on the display, and
   wherein the motion of the object is expressed in $p^{cam}$ and $d^{cam}$, and $p^{cam}$ represents a center position of the object, and $d^{cam}$ represents a unit vector in the front direction with respect to the motion platform.

2. The method of claim 1, wherein $p^{cam}$ represents the parallel movement information of the object, and $d^{cam}$ represents the rotation information of the object.

3. The method of claim 1,
   wherein the center position of the object is expressed in $(px, py, pz)^T$, px corresponds to a roll motion command, py corresponds to a heave motion command, and pz corresponds to a pitch motion command, and
   the unit vector in the front direction is expressed in $d^{cam}=(dx, dy, dz)^T$, dx corresponds to the roll motion command, dy corresponds to the heave motion command, and dz corresponds to the pitch motion command.

4. The method of claim 1, wherein the transforming into the motion command comprises: using a motion cueing algorithm (MCA).

5. The method of claim 4, wherein the MCA uses at least one of a velocity washout filter, an acceleration washout filter, and a tilt coordination acceleration washout filter.

6. The method of claim 4, wherein the MCA uses at least one of model predictive control (MPC) with velocity input, MPC with acceleration input, and MPC with acceleration input and tilt coordination.

7. A non-transitory computer-readable recording medium for implementing the method of transforming a degree of freedom (DoF) in a multiple sensorial media (mulsemedia) system of claim 1.

8. A method of transforming a degree of freedom (DoF) in a multiple sensorial media (mulsemedia) system, the method comprising:
   calculating, by a motion proxy calculator, a motion proxy corresponding to a motion of an object, using an object size (I) displayed on a display;
   calculating and scaling, by a motion proxy visual velocity scaler, a visual velocity of the motion proxy according to an object-relative perception mode or a subject-relative perception mode; and
   transforming, by a transformer, the motion proxy whose visual velocity is scaled into a motion command implementable within a motion range of a motion platform,
   wherein, the motion proxy $q^{cam}$ of the object is expressed as $$q^{cam}=A_n p^{cam}+(w_R(I)/w_T(I))B_n d^{cam}$$

wherein $A_n$ and $B_n$ denote matrices used to obtain a motion proxy that matches a motion platform of n DoFs,
   wherein a size of motion effects with respect to a rotation of the object is adjusted to a distance moved in a front direction by $(w_R(I)/w_T(I))$,
   wherein scale factors $w_R$ and $w_T$ are determined according to the object size (I) displayed on the display,
   wherein the motion of the object is expressed in $p^{cam}$ and $d^{cam}$, and $p^{cam}$ represents a center position of the object, and $d^{cam}$ represents a unit vector in the front direction with respect to the motion platform, and
   wherein in the subject-relative perception mode, the visual velocity of the motion proxy is calculated by scaling a change in a position of the object in a two-dimensional (2D) image of successive image frames and an actual depth direction velocity of the object.

9. The method of claim 8, wherein the motion proxy visual velocity scaler uses the object-relative perception mode when expressing the motion of the object as motion effects with respect to the object, and in the object-relative perception mode, the visual velocity of the motion proxy relative to an image background is calculated with respect to a local coordinate system of a user.

10. The method of claim 8, wherein the motion proxy visual velocity scaler uses the subject-relative perception mode when expressing the motion of the object as motion effects as seen from a user's point of view watching the object, and in the subject-relative perception, the visual velocity of the motion proxy is calculated with respect to a local coordinate system of the user.

11. The method of claim 8, wherein in the object-relative perception mode, the visual velocity of the motion proxy is calculated as a relative velocity between the object and an arbitrary object around the object.

12. The method of claim 8, wherein the transforming comprises:
   scaling, by a scaling unit, a size of the motion proxy whose visual velocity is scaled within a motion range of the motion platform; and applying, by a motion cueing algorithm (MCA) application unit, a MCA so as to be implementable within the motion range of the motion platform.

13. A device for transforming a degree of freedom (DoF), the device comprising:
- a motion detector configured to detect a motion of an object to which motion effects are to be provided in an image;
- a motion proxy calculator configured to calculate a motion proxy corresponding to the motion of the object, using an object size (I) displayed on a display; and
- a transformer configured to transform the motion proxy into a motion command implementable within a motion range of a motion platform,
- wherein the motion proxy represents a point at which 6-DoF motion of the object is reduced to a motion that matches the DoF of the motion platform, and provides three-dimensional (3D) parallel movement information and rotation information of the object,
- wherein, the motion proxy cram of the object is expressed as $$q^{cam} = A_n p^{cam} + (w_R(I)/w_T(I))B_n d^{cam}$$

wherein $A_n$ and $B_n$ denote matrices used to obtain a motion proxy that matches a motion platform of n DoFs,
- wherein a size of motion effects with respect to a rotation of the object is adjusted to a distance moved in front direction by $(w_R(I)/w_T(I))$,
- wherein scale factors $w_R$ and $w_T$ are determined according to the object size (I) displayed on the display, and
- wherein the motion of the object is expressed in $p^{cam}$ and $d^{cam}$, and $p^{cam}$ represents a center position of the object, and $d^{cam}$ represents a unit vector in the front direction with respect to the motion platform.

14. A device for transforming a degree of freedom (DoF), the device comprising:
- a motion proxy calculator configured to calculate a motion proxy corresponding to a motion of an object, using an object size (I) displayed on a display;
- a motion proxy visual velocity scaler configured to calculate and scale a visual velocity of the motion proxy according to an object-relative perception mode or a subject-relative perception mode; and
- a transformer configured to transform the motion proxy whose visual velocity is scaled into a motion command implementable within a motion range of a motion platform,
- wherein, the motion proxy $q^{cam}$ of the object is expressed as $$q^{cam} = A_n p^{cam} + (w_R(I)/w_T(I))B_n d^{cam}$$

wherein A and $B_n$ denote matrices used to obtain a motion proxy that matches a motion platform of n DoFs,
- wherein a size of motion effects with respect to a rotation of the object is adjusted to a distance moved in a front direction by $(w_R(I)/w_T(I))$,
- wherein scale factors $w_R$ and $w_T$ are determined according to the object size (I) displayed on the display,
- wherein the motion of the object is expressed in $p^{cam}$ and $d^{cam}$, and $p^{cam}$ represents a center position of the object, and $d^{cam}$ represents a unit vector in the front direction with respect to the motion platform, and
- wherein in the subject-relative perception mode, the visual velocity of the motion proxy is calculated by scaling a change in a position of the object in a two-dimensional (2D) image of successive image frames and an actual depth direction velocity of the object.

* * * * *